May 5, 1964

H. M. LANG ETAL 3,132,062

METHOD OF IN-PLACE LINING OF CONDUIT

Filed April 14, 1961

HAROLD M. LANG
LAWRENCE B. WILDER
*INVENTORS*

BY *Arthur Mc Elroy*

*ATTORNEY*

May 5, 1964 H. M. LANG ETAL 3,132,062
METHOD OF IN-PLACE LINING OF CONDUIT
Filed April 14, 1961 2 Sheets-Sheet 2

HAROLD M. LANG
LAWRENCE B. WILDER
*INVENTORS*

BY *Arthur McElroy*

*ATTORNEY*

United States Patent Office 3,132,062
Patented May 5, 1964

3,132,062
METHOD OF IN-PLACE LINING OF CONDUIT
Harold M. Lang and Lawrence B. Wilder, Tulsa, Okla., assignors to Pan American Petroleum Corporation, Tulsa, Okla., a corporation of Delaware
Filed Apr. 14, 1961, Ser. No. 103,029
4 Claims. (Cl. 156—287)

The present invention is concerned with a method of lining conduits, and the like. More particularly, it relates to a novel method for bonding a flexible liner to said conduit, or for forming a suitable rigid liner therein.

The desirability of a cheap, efficient method for installing a durable coating or protective surface in conduits has been recognized for some time. Painting or spraying of such coatings onto the inner surface of pipelines, etc., generally provides considerable protection; however, such methods are expensive and the application thereof is limited.

Figure 3:
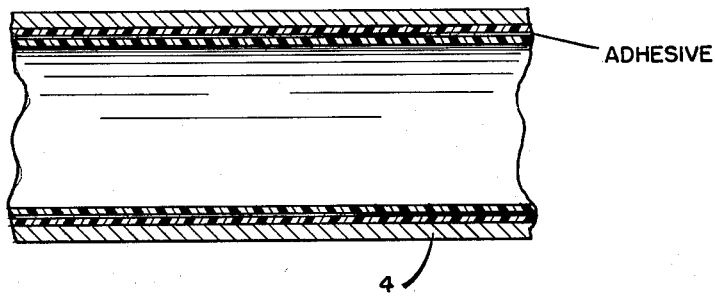
FIGURE 3 is a section of pipe having two plastic liners with a layer of adhesive between them.
Figure 4:
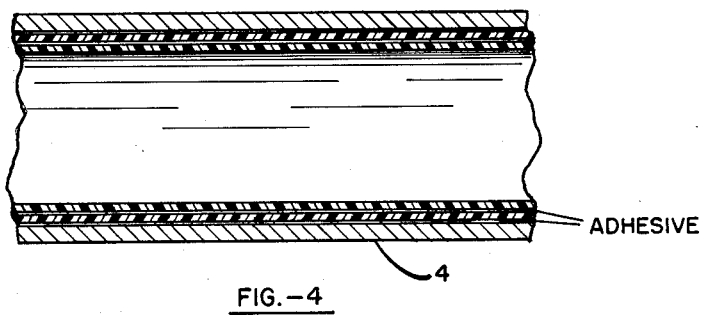
FIGURE 4 is a similar section having two plastic liners placed therein; however, in this instance the first, or outside, liner is held to the inside pipe surface by adhesive and a layer of adhesive lies between the first and second liners.

Briefly, the objects of our invention may be accomplished by either of two methods:

(1) By inserting a tubular liner into a conduit in accordance with a method described in U.S. 2,794,758, in which the inside of the liner has been coated, prior to installation, with a suitable cement or resin. Alternatively, the liner may be set in the conduit by first blowing or otherwise dispensing through the latter a powdered polymerization catalyst so as to coat the inside of the conduit therewith. Thereafter, a tubular liner having on the inside thereof a resin which tends to polymerize further on contact with said catalyst is introduced into the conduit in the same fashion as mentioned above. A pipe lined by this procedure is shown in FIGURE 4, and (2) By coating the outside surface of the liner prior to installation with a suitable adhesive material and then placing the liner into the conduit via the above-mentioned patented method. When the full length of the liner has been installed, pressure is maintained within the conduit while a second liner is placed in the same manner. If only a double liner is desired, the step of applying the adhesive can be omitted with the second liner. Otherwise, the procedure used to coat and place the first liner may be repeated several times to produce a rigid, tough laminated liner. FIGURE 3 illustrates a pipe lined by this method.

The method described and claimed in U.S. 2,794,758, referred to above, briefly involves the in-place lining of a pipeline, or similar conduit, with a tubular plastic liner which is initially mounted on a reel. The free end of the liner is anchored to the first end of the pipeline and then by fluid pressure exerted on the exterior of said liner at the anchored end thereof the liner is forced to pass through itself, i.e., is turned inside-out, and is paid off of the reel until half the length of the conduit is lined. At that point, the liner is severed at the supply reel, the free end of the liner is tied closed, and the remainder of the liner is then installed. When the liner is severed from the supply reel, the free end of the liner may be tied closed with a string which is then paid out from a string supply reel in order to provide a controlled tension to the liner as the last half of the conduit is lined. When the liner has reached the second end of the conduit and is anchored by any of a number of known methods, the string is withdrawn from the lined conduit.

In the first embodiment mentioned above, the cement or adhesive is applied to the inside of the liner prior to installation. Application of the adhesive may be accomplished simultaneously with fabrication of the tubular liner itself. Thus, in the manufacture of plastic tubing or thin-walled liners, a suitable plastic in soft form is forced through a die which is in the form of a plug having an annular slot therein. As the tubing is formed, the adhesive is sprayed on the inside thereof through an outlet in the die, as will be described in more detail below.

Alternatively, a polymerizable compound, in its monomeric or partially polymerized form, may be sprayed onto the interior of the tubing during manufacture, as mentioned above. The pipe or conduit which is to be lined with this tubing is coated on its interior, prior to the installation step, with a suitable catalyst capable of causing the monomer or partially-polymerized material to polymerize further or set up on contact with the catalyst. The latter may be in the form of a fine powder and blown into the conduit to be coated or, if desired, a combination of liquid catalyst and monomeric or partially-polymerized material may be used, depending, of course, upon the nature of the polymerizable compound. In either case, it will be apparent that the interior of the conduit may be coated with the polymerizable material or with the catalyst and the other component placed on the inside of the liner prior to installation. When a liquid catalyst is used to coat the inside of the pipe, it may be applied thereto by forcing it through the pipe with a pig or similar device. This operation may be conducted simultaneously with, or prior to, the installation step.

In the second embodiment, mentioned above, the liner is installed in accordance with the method outlined in U.S. 2,794,758, except for the fact that the outside thereof is coated with a thermosetting resin or other suitable adhesive material before said liner is turned inside-out in the pipe. For example, the liner itself may be run through rollers or brushes to distribute the adhesive over the outside thereof—which becomes the inner surface thereof when installed in the pipeline or conduit. As soon as the first liner is in place, a second one is installed inside the first, and sufficient pressure is applied to insure that the outer liner has intimate contact both with the interior surface of the conduit and the outer surface of the second liner. The latter may have adhesive on its interior after installation if it is desired to employ more than two liners for the operation. Pressure is held on the system until the adhesive between the two liners hardens or sets up. For this purpose, pressures of the order of 5 to 10 p.s.i. are generally adequate. If a thicker and more durable laminated liner is desired, the process may, of course, be repeated. The resulting product is a rigid liner inside the pipeline and anchored to the latter against flow tending to dislodge it. Collapse of the liner on reduction in pressure is prevented by the rigidity which the resin bond imparts to the laminated liner.

By providing this method of protecting conduit interiors, it will be immediately appreciated that not only the life of the conduit is extended, but the materials used in manufacturing such conduits need not be as expensive as has previously been required. For example, highly corrosive or reactive materials can be sent through ordinary carbon steel tubing lined in accordance with our invention instead of requiring stainless steel for this purpose. More-over, by providing a method for bonding these liners to the conduit wall it is possible to prolong the effective life of the liner. Conduits in which the liner is not bonded to the interior thereof sometimes develop leaks or weak spots as a result of continued flexing caused by delivery of fluids through them. When such leaks occur, the entire liner must be removed and replaced.

The two above-mentioned embodiments supplement one another to an appreciable extent. For example, where it is desired to install one of these liners in a conduit such as a sewer or a sewage line and it is impossible or undesirable to clean out the system before installation of the liner, the latter can be readily and efficiently placed therein by putting the adhesive on the outside of the liner and running it into the system by turning the liner inside-out, leaving the adhesive on the inside of the liner when the latter is in place. Thereafter, and while still retaining pressure on the system, the second liner is installed with or without adhesive on the outside thereof (prior to installation), depending upon whether or not another liner is to be added. Alternatively, a liner may be installed via the method of U.S. 2,794,758 after which, and while maintaining pressure thereon, a second liner is inserted in accordance with either of the embodiments described in method (1) above.

The procedure referred to above as "method (2)" is also useful where a laminated liner is placed in a main line of a gas distribution system and it is necessary to install side taps. When the system is subjected to sufficiently high pressure, the liner at the tap location bulges into the outlet and ruptures. The liner in the vicinity of the outlet hugs the surface about the outlet so as to make a self-energizing seal. Leak resistance of the T outlet is also improved by injecting a suitable liquid thermosetting resin through the side outlet around the plastic liner before the latter is ruptured at said outlet.

In another application of the process of our invention, a first liner may installed in accordance with method (2); the next liner may be installed via the process of U.S. 2,794,758 which, in turn, may be followed by installation of one or more liners in accordance with method (1). Obviously, the reverse of this procedure, or other modifications, may be employed where it is expedient to do so without departing from the scope of our invention.

The liners employed in carrying out the method of our invention may be manufactured from a number of commercially available plastic, or equivalent materials; for example, polyethylene polyesters such as those prepared from terephthalic acid and ethylene glycol, polyvinyl chloride-polyvinylidene copolymers, etc. The film thickness of these liners may vary widely, the main requirement in this regard being that they are sufficiently thin to be flexible so as to permit easy installation by the method described herein. In the majority of cases, film thickness of the order of about 1 to 5 mils are usually adequate.

The adhesives used will vary to some extent with the particular method employed. In the first method referred to, the adhesive may be a contact-type cement such as, for example, a rubber latex contact cement, if the entire adhesive system is to be inside the liner prior to installation thereof. Other materials such as molasses, polyvinyl acetate, and similar cements may likewise be used. Where a two-component adhesive is employed, i.e., where one of the materials is coated or sprayed on the pipeline interior prior to contact with the other, a number of combinations of materials may be used. For example, the component sprayed into the liner prior to installation may be a partially reacted mixture of resorcinol and formaldehyde, a monomer of methyl methacrylate, methacrylic acid, etc. If the resorcinol-formaldehyde mixture is used, powdered paraformaldehyde is blown through the conduit prior to the installation step. Subsequently, when the liner is turned inside out, the film of said mixture is brought into contact with the thin layer of paraformaldehyde powder, causing an adhesive bond to be formed between the conduit and the liner in a relatively short time. In establishing this bond, a pressure of 5 to 10 p.s.i. is preferably maintained on the system. If monomeric methyl methacrylate is used, or methacrylic acid is substituted for the resorcinol-folmaldehyde mixture, powdered benzoin or benzoyl peroxide, respectively, may be employed as the catalyst. These powdered materials may be used in amounts corresponding to from 0.5 to about 15 percent, based on the weight of the other component, and are referred to herein as the "adhesive activator." The bond thus formed between the liner and the pipe need not be a strong one, but should have enough body and strength to hold the liner in adhesive relationship with the interior of the pipe once the installation has been completed.

The adhesives used in the embodiment of our invention, wherein the tacky film is on the inside of the liner after installation, may be selected from a number of well-known cement or adhesive materials such as, for example, urea-formaldehyde, pheno-formaldehyde, melamine formaldehyde, epoxy resins, and other thermosetting resins. In many instances, molasses likewise may be used for this purpose. The expression "adhesive material," as used in the appended claims, is to be construed to include an adhesive, per se, or a material which on contact with a second substance is converted into an adhesive.

Figure 1:
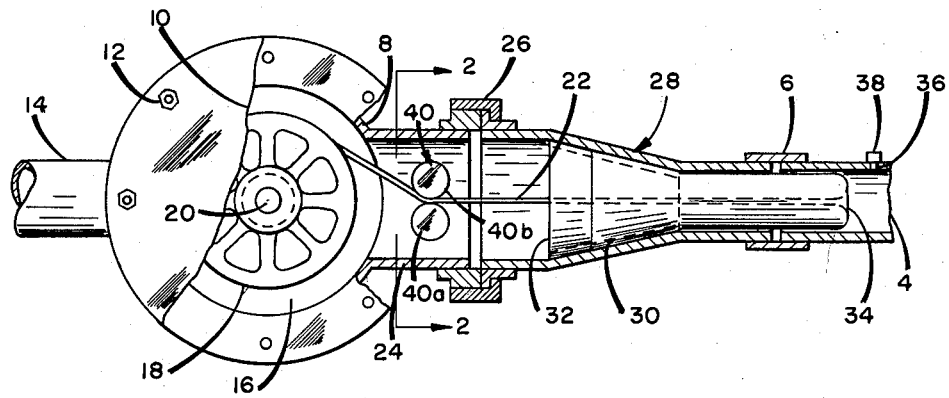
FIGURE 1 is a fragmentary elevational view, partly in section, showing one method of installing liners in accordance with our invention.

In FIGURE 1, which illustrates in detail an apparatus for lining pipe in accordance with our invention, the end, preferably the upstream end, of the pipe 4 which may be from a few feet to several thousand feet in length, is shown. The pipe may be constructed of substantially any suitable metal, hydraulic cement, vitreous material, etc. The pipe, which may otherwise be connected to a pipeline header or other fitting or which may be a segment of a previously installed pipeline, is first disconnected from the attached header or line so that the lining apparatus can be connected to the coupling 6 which is preferably at the upstream end of the segment. This lining apparatus comprises a housing 8 having a closure plate 10 attached as by bolts 12 to the periphery of the housing. A fluid inlet line 14 from a pressure source, such as a pump, is connected to the housing for supplying a fluid such as water, air, oil or gas to the chamber 16 inside the housing 8. A reel 18 is mounted on axle 20 within the housing. This reel contains a spooled, tubular, flexible plastic liner 22, the liner being collapsed on the reel so that the reel, while small, will hold several hundred feet of liner.

The housing 8 is connected via an outlet 24 through a union 26 to an upstream liner anchor 28. This anchor is then connected to coupling 6. The anchor includes a frusto-conical section 30 having a complementary frusto-conical wedge 32. Other anchor means, such as flanged couplings having a flared end of the tubular liner between the flanges, may be substituted.

Figure 2:
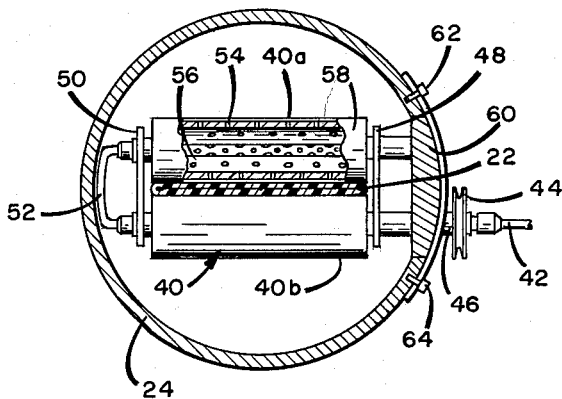
FIGURE 2 is a cross-section of FIGURE 1, taken along line 2—2.

In operation, the upstream liner anchor 28 is connected to the collar on coupling 6. The spool of flexible plastic liner is placed in the pressure chamber and the end is then drawn off the reel 18 and run through rollers 40, kept moist with a suitable thermosetting adhesive material fed into the rollers through line 42, as shown in FIGURE 2. Referring for a moment to FIGURE 2, it is seen that rollers 40 may be operated either by the passage of liner 22 between them or by means of a belt drive operating off pulley 44 and drive shaft 46. The distance between the rollers is regulated by means of tension bars 48 and 50. Liquid adhesive flows through U-shaped tube 52 and into upper roller 40a having perforations 54 and a hollow perforated core 56. The adhesive then flows through fabric cover 58 and onto the exterior surfaces of plastic liner 22. Lower roller 40b is similarly constructed. The entire roller assembly is held in position by face plate 60 bolted to outlet 24 at 62 and 64.

The assembly may be removed from the system, cleaned, repaired or replaced, merely by removing bolts 62 and 64.

Plastic liner 22 is drawn through frusto-conical wedge 32, and then stretched back over it with the end of the liner at the large diameter end of the wedge. The folded liner and wedge are then inserted into the upstream liner anchor 28, as shown in the drawing, and the wedge is forced into position in the frusto-conical section 30 so that the end of the liner is peripherally anchored in the pipe. The housing 8 is then connected by union 26 to the upstream liner anchor 28. A fluid, such as water, is then injected through pressure line 14. This fluid flows into the annular fold 34, forcing the fold to move through pipe 4.

As fold 34 is displaced through the pipeline, the liner approximately fills the pipe and displaces all fluids previously in the line ahead of the fold and away from the pipe wall. In some cases, however, as for example at a low point in a pipeline, all of the fluid may not be displaced ahead of the fold and it may be trapped between the liner and the pipeline. In such cases, holes 36 are drilled along the pipeline and preferably tapped prior to installation of the liner. After the liner has been installed, pressure may be applied internally to the liner to distend it and displace or bleed the fluid from this annular space either through holes 36 or around the unanchored downstream end of the liner. After the fluid has been displaced from this annular space, plugs 38 are placed in the holes 36 to seal this space so that the liner is held snugly against the inside wall of the pipeline. With the liner at least half in place, i.e., with fold 34 at least halfway through the pipe, union 26 may be disconnected and the housing 8, reel 18 and surplus liner 22 therein may be removed. The end of the upstream anchor 28 may then be reconnected into the pipe, the header, or the like. The downstream end of the liner may be left disconnected or it may, obviously, be connected into an anchor of the type used on the upstream end.

Figure 5:
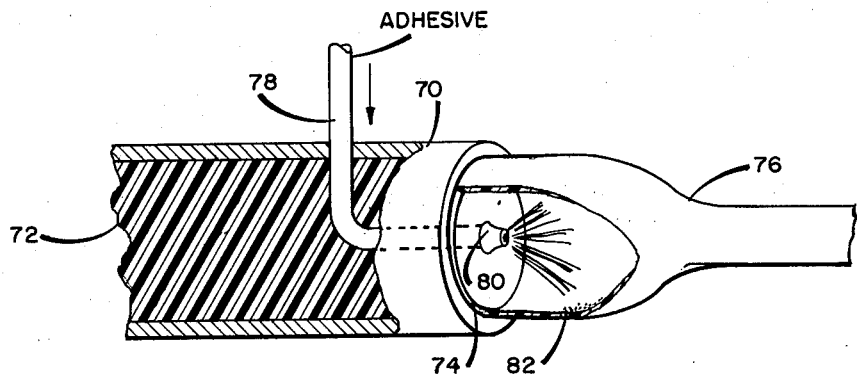
FIGURE 5 is a fragmentary view, partly in section, demonstrating apparatus suitable for simultaneously forming the plastic liner and applying adhesive to the newly-formed liner.

FIGURE 5 illustrates an apparatus suitable for use in preparing collapsible plastic liners having an adhesive material on the inside of said liner prior to installation. A metal die body 70 is filled with a plastic 72 such as, for example, polyethylene, which is heated to extrusion temperature. The soft plastic is forced through annular slot 74 to form a hollow liner or tube 76 which collapses and is rolled onto a reel or similar device, as shown in FIGURE 1. Prior to collapsing the liner, a spray of adhesive flowing through pipe 78 is delivered to the interior surface of the liner via nozzle 80 to form a uniform layer of adhesive 82 on the interior surface of said liner.

We claim:

1. A method for installing a tubular laminated liner in a conduit comprising peripherally connecting one end of a first flexible tubular liner to a first end of said conduit, thereafter forcing the free end of said liner through the connected end thereof by means of fluid pressure whereby said liner is turned inside-out in said conduit, peripherally connecting one end of a second flexible tubular liner having an adhesive material on the inside thereof to an end of said conduit, forcing the free end of said second liner through the connected end thereof by means of fluid pressure while maintaining sufficient pressure in said conduit to retain said first liner against the walls of said conduit whereby said second liner is turned inside-out within said first liner and placed in contact therewith, whereby an adhesive bond is established between said first and second liners.

2. A method for installing a tubular laminated liner in a conduit comprising peripherally connecting one end of a first flexible tubular liner to a first end of said conduit, thereafter forcing the free end of said liner through the connected end thereof by means of fluid pressure, whereby said liner is turned inside-out in said conduit, peripherally connecting one end of a second flexible tubular liner having an adhesive material on the inside thereof to said first end of said conduit and forcing the free end of said second liner through the connected end thereof by means of fluid pressure while maintaining sufficient pressure in said first liner to retain said first liner against the walls of said conduit, whereby said second liner is turned inside-out within said first liner and placed in contact therewith, to secure an adhesive bond between said first and second liners, and connecting the free ends of each of said liners to the other end of said conduit.

3. The process of claim 1 in which the adhesive material is molasses.

4. A method for installing a normally collapsible tubular laminated liner in a conduit comprising peripherally connecting one end of a first collapsible tubular liner to a first end of said conduit, thereafter forcing the free end of said liner through the connected end thereof by means of fluid pressure whereby said liner is turned inside out in said conduit, applying an adhesive material to the exterior of said first liner while the latter is being forced by said fluid pressure through said conduit so that when said liner is turned inside out the resulting adhesive layer is on the interior of said liner, peripherally connecting one end of a second normally collapsible tubular liner to an end of said conduit and forcing the free end of said second liner through the connected end thereof by means of fluid pressure while maintaining a sufficient pressure in said conduit to retain said first liner against the walls of said conduit whereby said second liner is turned inside out within said first liner and placed in contact therewith, and securing an adhesive bond between said first and second liner by maintaining sufficient fluid pressure within said second liner to retain the latter against said first liner until said bond has been formed.

References Cited in the file of this patent

UNITED STATES PATENTS

| | | |
|---|---|---|
| 2,794,758 | Harper et al. | June 4, 1957 |
| 2,817,620 | Golick | Dec. 24, 1957 |